United States Patent [19]

Thiel et al.

[11] Patent Number: 4,887,211

[45] Date of Patent: Dec. 12, 1989

[54] IMAGE PROCESSOR

[75] Inventors: Geoffrey L. Thiel, Richmond; Douglas H. Hodgkiss, Sheppston, both of United Kingdom; Hisanori Tohara, Otawara, Japan

[73] Assignee: Kabushiki Kaisha Toshiba, Kanagawa, Japan

[21] Appl. No.: 934,846

[22] Filed: Nov. 25, 1986

[30] Foreign Application Priority Data

Nov. 27, 1985 [JP] Japan .................................. 60-264932

[51] Int. Cl.[4] ............................................. G06F 15/42
[52] U.S. Cl. .................................. 364/413.13; 378/901
[58] Field of Search ........................... 364/414, 413.13; 378/901; 250/445.7

[56] References Cited

U.S. PATENT DOCUMENTS

| 4,135,247 | 1/1979 | Gordon et al. | 364/414 |
| 4,320,453 | 3/1982 | Roberts et al. | 364/200 |
| 4,520,442 | 3/1985 | Grimberg et al. | 364/900 |
| 4,578,752 | 3/1986 | Klausz | 364/414 |

Primary Examiner—Jerry Smith
Assistant Examiner—Kim Thanh I. Bui
Attorney, Agent, or Firm—Finnegan, Henderson, Farabow, Garrett and Dunner

[57] ABSTRACT

An apparatus for processing image data of a computerized tomography system having image data acquisition and main storage devices is provided. The image processing apparatus includes an image processor memory for storing image data and a plurality of operation means having processing apparatus for sequentially performing processing operations on the image data. The apparatus further includes a process controller for providing the image processor memory and the operation means with control data specifying the processing operations to be sequentially performed by the plurality of operation means and for generating sequence selection data. The apparatus also includes a sequencer means for selecting the sequence in which the processing operations are to be performed in accordance with the sequence selection data. The image processing apparatus permits selective interconnection of the image processor memory and the plurality of operation means under control of control data comprising a program to perform processing functions. Alternative schemes of interconnection may be utilized to perform different processing functions. The image processor and plurality of operating means are arranged in parallel. Accordingly, additional operating means may be readily added to the image processing apparatus to enhance the capability of the apparatus. Functional checks are performed on the inputs and output of the image processor memory and each of the operating means by a process controller.

15 Claims, 10 Drawing Sheets

INTERCONNECTION SCHEME FOR BACK PROJECTION

OVERLAPPING IMAGES

INTERCONNECTION SCHEME
FOR OVERLAPPING

IMAGE PROCESSOR

BACKGROUND OF THE INVENTION

I. Field of the Invention

This invention relates generally to an apparatus for processing image data, and more specifically to an apparatus for processing image data of a computerized tomography (CT) system in order to construct tomographic images.

II. Background Information

The conventional CT system as disclosed, for example, in U.S. Pat. No. 4,135,247 to Gordon et al. includes a CT scanner comprising a radiation (e.g., x-ray) source, and radiation detectors for scanning an object to collect image data. The radiation source of the CT scanner is rotated about the object. The radiation source generates radiation (e.g., X-ray) beams which are directed toward the object. As the radiation source is rotated about the object, the radiation beams pass through the object at points along one-dimensional lines or slices of the object and emerge from the object at intensities which vary according to the composition of the object at the points through which the radiation beams are passed. The radiation detectors are positioned opposite the radiation source to detect beams emerging from the object. The radiation source and the radiation detectors are arranged to scan the object by rotating the radiation source at least 180° around the object. The radiation detectors detect beams for the complete 180° range of rotation of the radiation source and for fan beams beyond the range of rotation of the radiation source. (In an alternative arrangement, the CT scanner may include a single radiation detector which rotates around the object opposite the radiation source to detect emerging radiation beams.)

Each radiation detector is a discrete element having a current output which corresponds in magnitude to the intensity of the X-ray beam emerging from the object at a given angle and incident on the radiation detector.

The current outputs of the radiation detectors for radiation beams emerging from the object at given angles comprise image data of the CT scanner for the points along the one-dimensional lines or slices of the object about which the source is rotated. The image data for the object, as collected by the CT scanner, is in analog form.

The conventional CT system further comprises a converter and an image data processor. The converter first LOG converts (or LOG amplifies) the image data of the CT scanner, then converts the image data from analog form to digital form. After the image data has been LOG converted and put in digital form, the image data is provided to the image data processor.

The image data processor processes the image data to construct a tomographic image of the object irradiated by the radiation source of the CT scanner. The image data processor includes a corrector, a convolver, and a back projector. The corrector utilizes correction data obtained by taking image data for well known phantom objects (as, for example, water) to correct converted image data. The correction data enables the corrector to determine and compensate for the nonuniform sensitivity of the radiation detectors. The corrected image data is supplied to the convolver. The corrected image data is convolved in accordance with a specific filter function to ensure that the constructed tomographic image is not blurred. The image data, having been corrected and convolved by the image processor, is subsequently back projected by the image data processor. Convolved image data is supplied to the back projector which has an image memory for storing image data for a one-dimensional line of image data obtained by the CT scanner. The convolved image data for a one-dimensional line is back projected according to the location of points along the one dimensional line from where the image data was collected, and according to the angle of rotation of the radiation source utilized in obtaining image data for each of the points along the one-dimensional line. The back projected data is stored in the image memory according to the location of points and the given angles of rotation.

The image processor of a conventional CT system performs the correction, convolution and back projection of image data at relatively high speed. Each of the steps of correction, convolution and back projection are performed by separate hardware units which are arranged in a pipeline processor arrangement in accordance with the sequence of processing steps to be performed.

The hardware units of the conventional CT system image processor can perform, however, only a single designated processing function, such as correction, convolution or back projection. Processing of image data is therefore limited, for systems not having a variety of hardware units, to only those single processing functions performed by each hardware unit of the CT system. For example, the conventional CT system having a corrector, convolver, and back projector cannot perform overlapping and magnification. To accomplish these additional operations, additional hardware units are required.

Further, the hardware units are arranged in a pipeline processor arrangement and data flows only one way through the pipeline-arranged hardware units, with processed image data being stored at the end of the pipeline only. Functional checks of the output from each of the processing hardware units cannot be performed while the CT system image processor is being operated.

Accordingly, an object of the present invention is to provide an apparatus for processing image data of a CT system which utilizes basic operation circuits which are arranged in parallel, and which are interconnected under the control of a program to other basic operation circuits to perform different processing functions.

Another object of the present invention is to provide an apparatus for processing image data of a CT system which may perform functional checks on the operation of each operation circuit of the image data processing apparatus.

Yet another object of the present invention is to provide an apparatus for processing image data of a CT system to which additional operation circuits may be added in parallel to increase the processing capability of the image data processing apparatus.

Another object of the present invention is, further, to provide an apparatus for processing image data of a CT system which includes a process controller for controlling the transfer of data between memories to minimize transfer loss.

Additional objects and advantages of the invention will be set forth in the description which follows, and in part will be obvious from the description or may be learned by practice of the invention.

SUMMARY OF THE INVENTION

To achieve the foregoing objects, and in accordance with the purposes of the invention as embodied and broadly described herein, an apparatus for processing image data of a computerized tomography system having image data acquisition and main storage devices is provided comprising: an image processor memory for storing image data; a main memory bus for transferring image data between the image processor memory and the data acquisition and main storage devices; a plurality of operation means having processing apparatus for sequentially performing processing operations on image data, each operation means having a plurality of inputs and an output; an image processor bus for interconnecting the image processor memory with each of the plurality of operation means, and for interconnecting each of the plurality of operation means with each other to provide inputs to each of the plurality of operation means; a process controller for providing the image processor memory and the operation means with control data specifying the processing operations to be sequentially performed by the plurality of operation means, and with image data, and for generating sequence selection data for use in selecting the sequence in which the processing operations are to be performed; sequencer means for selecting the sequence in which the processing operations are to be performed in accordance with the sequence selection data, and for providing the image processor memory and the plurality of operation means with sequence data specifying the sequence of the processing operation to be performed by the plurality of operation means; a control bus for interconnecting the process controller with the image processor memory and the plurality of operation means for transferring control data and image data from the process controller to the image processor memory and the plurality of operation means and for interconnecting the process controller with the sequencer means for transferring sequence selection data from the process controller to the sequencer means; and a sequencer bus for connecting the sequencer means to the image processor memory and the plurality of operation means for transferring sequence data from the sequencer means to the image processor memory and the plurality of operation means.

BRIEF DESCRIPTION OF THE DRAWINGS

The accompanying drawings, which are incorporated in and constitute part of the specification, illustrate a preferred embodiment of the invention, and together with the general description given above and the detailed description of the preferred embodiment given below, serve to explain the principles of the invention.

DESCRIPTION OF THE PREFERRED EMBODIMENTS

Figure 1:
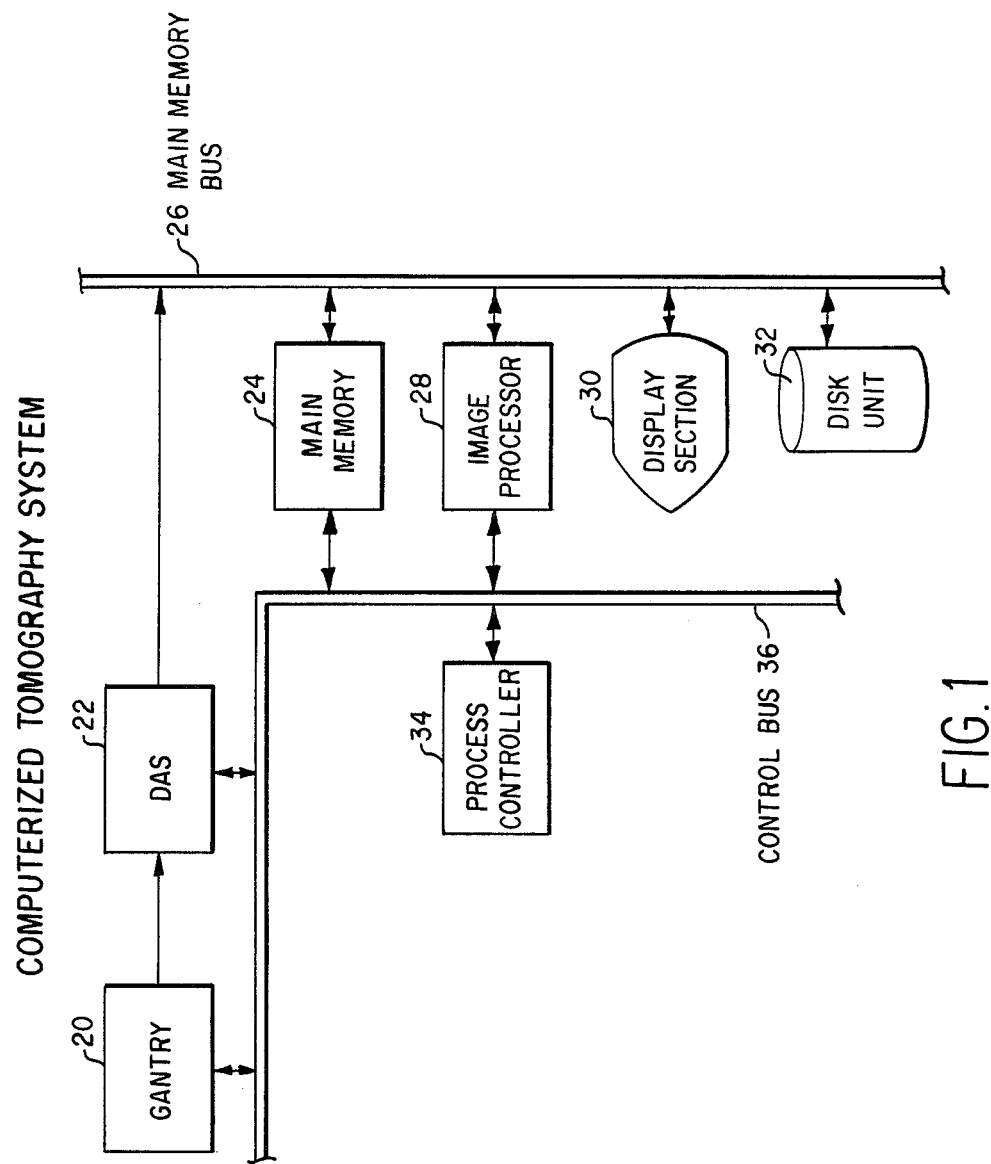
FIG. 1 is a block diagram of a computerized tomography system having an apparatus for processing image data which incorporates the teachings of the present invention.

Referring to FIG. 1, a computerized tomography (CT) system is shown. The CT system includes a gantry 20 in which is located a CT system scanner. The scanner includes a radiation source and radiation detectors. The radiation (e.g. X-ray) source rotates around an object which is removably situated in gantry 20. The radiation source generates radiation (e.g., X-ray) beams which are directed at the object and pass through the object. The radiation beams may be radiated either continuously or may be pulsed. The radiation beams emerging from the object are incident on the radiation detectors which are situated to capture beams radiated by the radiation source when positioned at various angles of rotation.

Each radiation detector generates a current signal which is proportional in magnitude to the radiation beam incident thereon. The current outputs of the radiation detectors for radiation beams emerging from the object at given angles comprise image data of the CT scanner for a one-dimensional line or slice of the object about which the source is rotated. Image data for the object is comprised of image data for each of the one-dimensional lines of the object about which the radiation source is rotated. The image data for the object, as generated by the CT system scanner, is in analog form.

The CT system scanner located in gantry 20 is connected to a Data Aquisition system (DAS) 22. The image data which is generated by the CT system scanner located in gantry 20 is transferred to DAS 22. The image data received by DAS 22 from the CT system scanner is logarithmically amplified by DAS 22 and then converted by DAS 22 from analog form into digital form. The amplified and converted image data is then transferred from DAS 22 to main memory 24 over a main memory bus 26 which is connected both to DAS 22 and main memory 24. Main memory bus 26 is also connected to an image processor 28, a display section 30 and a disk unit 32. Display section 30 receives image data directly from DAS 22 or indirectly through main memory 24 (that is from DAS 22 via main memory 24) and displays the image data in the form of visible images on a screen. Disk unit 32 may be, for example, of the type described in U.S. Pat. application Ser. No. 554,727 assigned to the same assignee for the present invention. Disk unit 32 is used as a remote storage device to which data from main memory 24 may be transferred.

Image processor 28 processes image data which is transferred either from DAS 22 or disk unit 32 to main memory 24 and then from main memory 24 to image processor 28. Image processor 28 may be implemented to process the image data either by correcting, convolving or back projecting the image data. Utilizing time division techniques, image processor 28 of the present invention may sequentially correct, convolve, and then back project image data for a data group, e.g., for the image data representing 64 positions or points along a one-dimensional line of the image being scanned. Image processor 28 may also be implemented to further process image data in order to, for example, enlarge or overlap the image or images to be constructed.

The CT system also includes a process controller 34 and a control bus 36. Process controller 34 is interconnected with gantry 20, DAS 22 and main memory 24 by control bus 36. Process controller 34 controls gantry 20, DAS 22 and main memory 24 by control data supplied over control bus 36.

Process controller 34 also controls the operation of image processor 28 and is interconnected with image processor 28 by control bus 36. Accordingly, image processor 28, as embodied in the present invention and as described below, may also be considered as comprising process controller 34.

Figure 2:
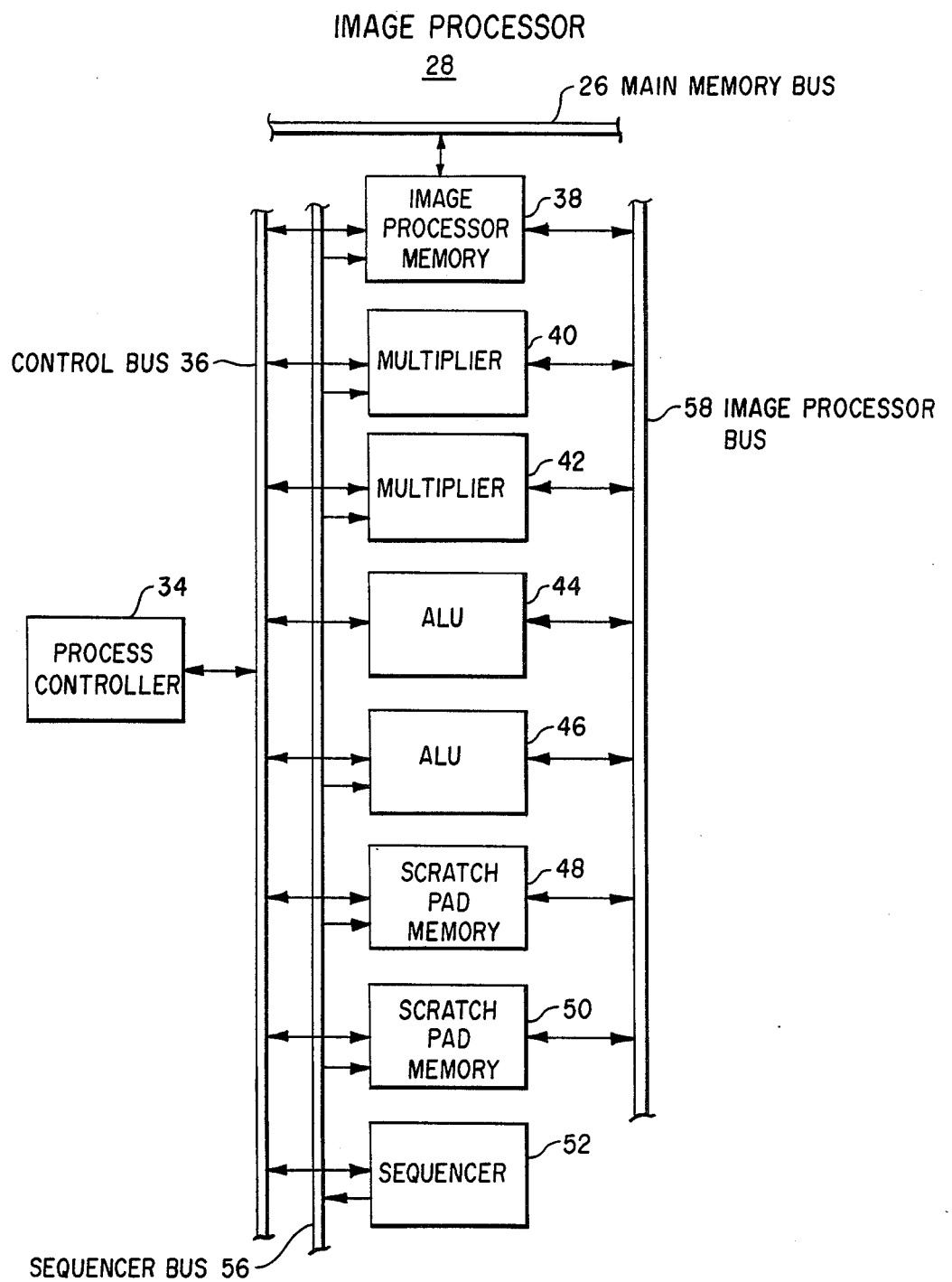
FIG. 2 is a block diagram of an apparatus for processing image data of a computerized tomography system incorporating the teachings of the present invention.

As shown in FIG. 2, image processor 28 includes a cache memory which is hereinafter referred to as image processor memory 38, and a plurality of operation means having operation components for sequentially performing processing operations on image data. As embodied in the present invention, the operation means include a plurality of multiplier means, a plurality of arithmetic logic means, and a plurality of working memory units. In the embodiment of the present invention described herein, the plurality of multiplier means comprises a first multiplier 40 and a second multiplier 42. The plurality of arithmetic logic means comprises a first arithmetic logic unit (ALU) 44 and a second ALU 46. The plurality of working memory means comprises a first scratch pad memory (SPM) 48 and an SPM 50. Image processor 28 further includes a sequencer means for providing sequence data specifying the sequence of processing operations to be performed by the plurality of operation means. As embodied herein, the sequencer means comprises a sequencer 52. Image processor 28 also includes process controller 34 as described above.

Image processor memory 38, each of the plurality of operation means, that is, multipliers 40 and 42, ALUs 44 and 46, and SPMs 48 and 50, and sequencer 52 are interconnected with process controller 34 by a control bus 36. Image processor memory 38 and the plurality of operation means multipliers 40 and 42, ALUs 44 and 46 and SPMs 48 and 50 are further interconnected with sequencer 52 by a sequencer bus 56, and interconnected with each other by an image processor bus 58.

Image processor 28 is interconnected with main memory 24 by main memory bus 26 which is connected to image processor memory 38 and main memory 24. Image processor 28 receives image data for processing from main memory 24 (or also from DAS 22 which is also connected to main memory bus 26) and also transfers processed image data to main memory 24 over main memory bus 26.

Image data to be processed by image processor 28 (and address data associated with the image data) is first stored in image processor memory 38, and thereafter transferred to the plurality of operation means over image processor bus 58. Control data provided by process controller 34 specifies the processing operations to be performed by the plurality of operation means in order to complete a processing function such as convolution. The plurality of operation means perform the specified processing functions, transferring imaga data inputs and outputs between the operation means, as necessary, over image processor bus 58 in accordance with a sequence specified by sequence data from sequencer 52 and provided over sequencer bus 56. In the foregoing description, each of the plurality of operation means and image processor memory 38 are described. Thereafter, interconnection schemes for performing processing functions are described.

Generally, multipliers 40 and 42 each select two inputs from the image data available from image processor memory 38 and each of the other plurality of operation means over image processor bus 58, and multiply the two inputs to produce an output. The outputs from multipliers 40 and 42 are available to image processor memory and each of the plurality of operation means over image processor bus 58. Each multiplier provides a 32-bit output.

ALUs 44 and 46 each select two inputs from the image data available from image processor memory 38 and the plurality of operation means over image processor bus 58, and perform arithmetic or logical operations on the two inputs. Operations which may be performed include, for example, addition, subtraction, exclusive OR, etc. The result of an operation comprises an output which is made available to image processor memory 38 and each of the operation means over image processor bus 58. Each ALU provides two 32-bit outputs.

SPMs 48 and 50 each select a first input of image data and a second input which is an address of a SPM location for storing image data. The image data (and address data) is available from image processor memory 38 and the other plurality of operation means over image processor bus 58. The first input of image data is stored in a location of memory identified by the address data of the second input. Further, image data stored in any given memory location of SPM 48 or 50 may be made available to image processor memory 38 and the plurality of operation means over image processor bus 58.

The cycle time necessary to complete any single operation is the same for image processor memory 38 and the plurality of operation means, and each of the foregoing devices operates in accordance with sequence data from sequencer 52. The sequence data controls the sequential operation of the plurality of operation means and the sequential flow of image data between image processor memory 38 and each of the operation means over image processor bus 58.

Figure 3:
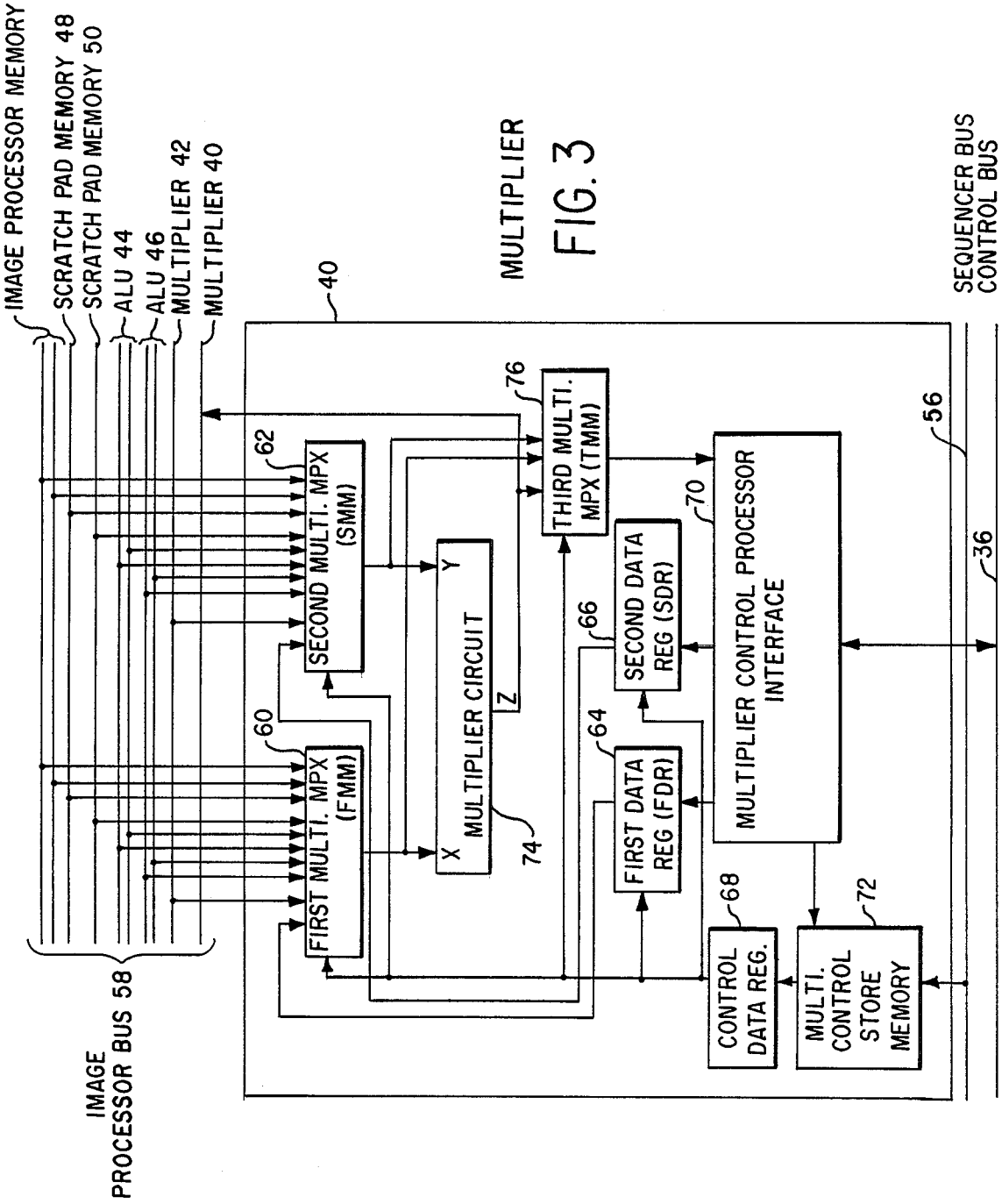
FIG. 3 is a block diagram of a multiplier of the apparatus for processing image data of FIG. 2.

Referring to FIG. 3, a multiplier of the image processor of the present invention is shown. The multiplier block diagram is illustrative of both multipliers 40 and 42 which have identical structure. Accordingly, only multiplier 40 is referred to in the foregoing description. Image data from image processor memory 38 and the plurality of operation means is available for use by multiplier 40 over image processor bus 58. Image processor bus 58 is connected to multiplier 40 through both a first multiplier multiplexer (FMM) 60 and a second multiplier multiplexer (SMM) 62 of first multiplier 40.

Image processor bus 58 includes two lines which carry output from image processor memory 38, two lines carrying output from SPMs 48 and 50, four lines carrying output from ALUs 44 and 46 (two lines per each ALU) and two lines carrying output from multipliers 40 and 42. Thirty two-(32) bit words of data are carried on each line of image processor bus 58. A first data register (FDR) 64 and a second data register (SDR) 66 of multiplier 40 are also connected to FMM 60 and SMM 62, respectively, and image data from these registers is available for use by multiplier 40. The transfer of image data from FDR 64 and SDR 66 to FMM 60 and SMM 62, respectively, is controlled by control data from a multiplier control data register 68 which is connected to FDR 64 and SDR 66. Multiplier control data register 68 is also connected to FMM 60 and SMM 62. FMM 60 and SMM 62 each select an input from the available image data in accordance with control data provided by multiplier control data register 68. The control data utilized in controlling the image data transfer by FDR 64 and SDR 66 and the input selection by FMM 60 and SMM 62 is transferred to multiplier control data register 68 over control bus 36 through a multiplier process controller interface 70 and a multiplier control store memory 72. Control bus 36 interconnects process controller 34 and multiplier process controller interface 70. Multiplier process controller interface 70 is connected to multiplier control store memory 72.

The inputs selected by FMM 60 and 62 are transferred to a multiplier circuit 74 as inputs X and Y, respectively. Inputs X and Y are also transferred to a third multiplier multiplexer (TMM) 76.

Inputs X and Y are multiplied by multiplier circuit 74 to produce a multiplier 40 output Z (X·Y=Z) which is transferred to a line of image processor bus 58 to make output Z of multiplier 40 available to image processor memory 38 and the plurality of operation means. Output Z is also transferred to TMM 76. Multiplier control data register 68 is connected to TMM 76 and TMM 76 is responsive to control data from multiplier control data register 68. TMM 76, in accordance with control data from control data register 68, selects between inputs X and Y, and output Z to transfer the selected input or output to multiplier process controller interface 70. The input or output transferred from TMM 76 to multiplier process controller interface 70 is then transferred to process controller 34 over control bus 36. Process controller 34 checks the input or output received to determine whether multiplier 40 is operating in accordance with the control data.

Multiplier process controller interface 70 serves also as an interface between process controller 34 and multiplier control store memory 72 for transferring control data. The control data is transferred by multiplier process controller interface 70 from process controller 34 to memory locations of multiplier control store memory 72 predetermined by process controller 34. Interface 70 also serves as an interface between process controller 34 and FDR 64 and SDR 66 to transfer image data provided by process controller 34 from process controller 34 to FDR 64 and SDR 66.

Sequencer 52 is connected to multiplier control store memory 72 of multiplier 40 by sequencer bus 56. Sequencer 52 sequentially provides multiplier control store memory 72 with sequence data in the form of addresses of multiplier control store memory 72 to access control data stored at multiplier control store memory locations corresponding to the addresses. The accessed control data is transferred to multiplier data control register 68 which is connected to multiplier control store memory 72 and used to control FDR 64, SDR 66, FMM 60, SMM 62 and TMM 76 at any given time.

Figure 4:
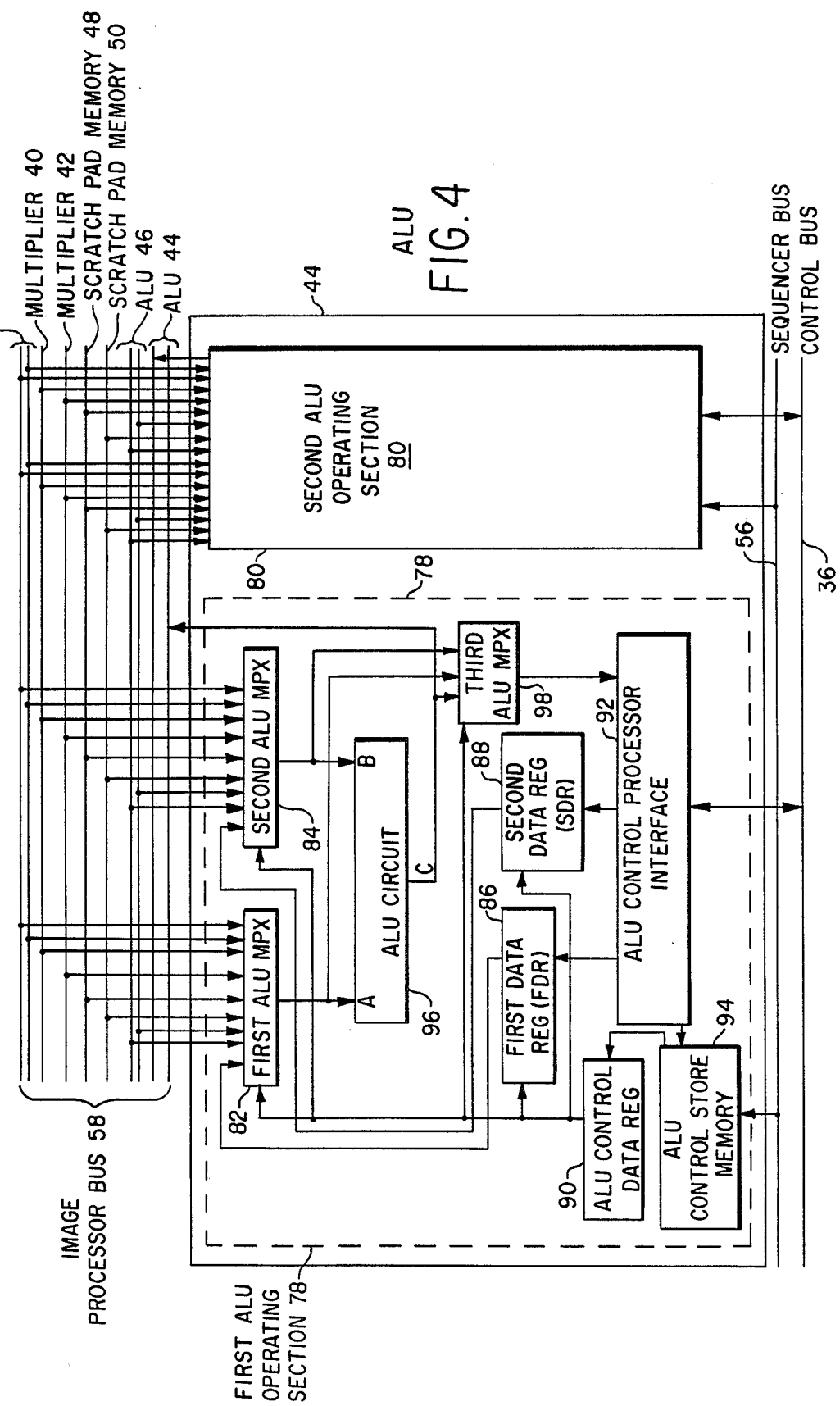
FIG. 4 is a block diagram of an arithmetic logic unit of the apparatus for processing image data of FIG. 2.

A block diagram of an arithmetic logic unit (ALU) of the image processor of the present invention is shown in FIG. 4. The block diagram of FIG. 4 is illustrative of both ALUs 44 and 46 which are identical in structure. Accordingly, only ALU 44 is referred to in the foregoing description.

ALU 44 is comprised of two identical operating sections, a first operating section 78 and a second operating section 80. Accordingly, the foregoing description of first operating section 78 is equally descriptive of second operating section 80.

Image data from image processor memory 38 and the plurality of operation means of the image processor 28 are available to first operation section 78 of ALU 44 over image bus 58. Image processor bus 58 includes the output lines as described in connection with the first multiplier 40 of FIG. 3. Image processor bus 58 is connected to both a first ALU multiplexer 82 and a second ALU multiplexer 84 of first operation section 78. Data from an FDR 86 and an SDR 88 are also available to first ALU multiplexer 82 and second ALU multiplexer 84, respectively. An ALU control data register 90 is connected to first and second ALU multiplexers 82 and 84, FDR 86 and SDR 88. The transfer of data from FDR 86 and SDR 88 to first ALU multiplexer 82 and second ALU multiplexer 84, respectively, is in accordance with control data provided to FDR 86 and SDR 88 by ALU control data register 90. First and second ALU multiplexers 82 and 84 each select an input from the available data in accordance with control data provided by a ALU control data register 90.

The control data utilized in controlling the data transfer from FDR 86 and SDR 88 to ALU multiplexers 82 and 84 and the input selection by ALU multiplexers 82 and 84 is transferred to ALU control data register 90 from process controller 34 over control bus 36 via an ALU process controller interface 92 and an ALU control store memory 94. Control bus 36 interconnects process controller 34 and ALU process controller interface 92. ALU process controller interface 92 is connected to ALU control store memory 94. And ALU multiplier control store memory 94 is connected to ALU control data register 90.

The inputs selected by first and second ALU multiplexers 82 and 84 are transferred to an ALU circuit 96 as inputs A and B, respectively. Inputs A and B are also transferred to a third ALU multiplexer 98. ALU circuit 96 is implemented to operate upon inputs A and B by performing an arithmetic or logic operation, as for example, addition, subtraction, logical sum or exclusive OR to provide an output C. Output C is transferred from ALU circuit to third ALU multiplexer 98 and to a line of image processor bus 58 to make the image data of output C of ALU 44 available to image processor memory 38 and the plurality of operation means of image processor 28.

ALU control data register 90 is connected to third ALU multiplexer 98, and third ALU multiplexer 98 is responsive to control data provided by ALU control data register 90. Third ALU multiplexer 98 selects between inputs A and B and output C in accordance with the control data, and transfers the selected input or output to ALU process controller interface 92. ALU process controller interface 92 is interconnected with process controller 34 by control bus 36. The selected input or output is transferred from ALU process controller interface 92 to process controller 34 over control bus 36. Process controller 34 checks the selected input or output received to determine whether first operating section 78 of ALU 44 is operating in accordance with the control data.

ALU process controller interface 92 is also connected to ALU control store memory 94 and serves as an interface between process controller 34 and ALU control store memory 94 to transfer control data to memory 94. The control data is transferred to ALU control store memory locations predetermined by process controller 34. Additionally, ALU process controller interface 92 serves as an interface between process controller 34 and FDR 86 and SDR 88 to transfer data provided by process controller 34 to FDR 86 and SDR 88.

Sequencer 52 is connected to ALU control store memory 94 of first operating section 78 by sequencer bus 56. Sequencer 52 sequentially provides ALU control store memory 94 with sequence data in the form of addresses of memory 94 to access control data stored at memory locations corresponding to the addresses. The accessed control data is transferred to ALU data control register 90 and used to control FDR 86, SDR 88, first ALU multiplexer 82, second ALU multiplexer 84 and third ALU multiplexer 98 at any given time.

First and second operation sections 78 and 80 of ALU 44 operate independently. Each selects two inputs from image processor bus 58 and outputs an output C to bus 58. ALUs 44 and 46 together provide four outputs to bus 58.

Figure 5:
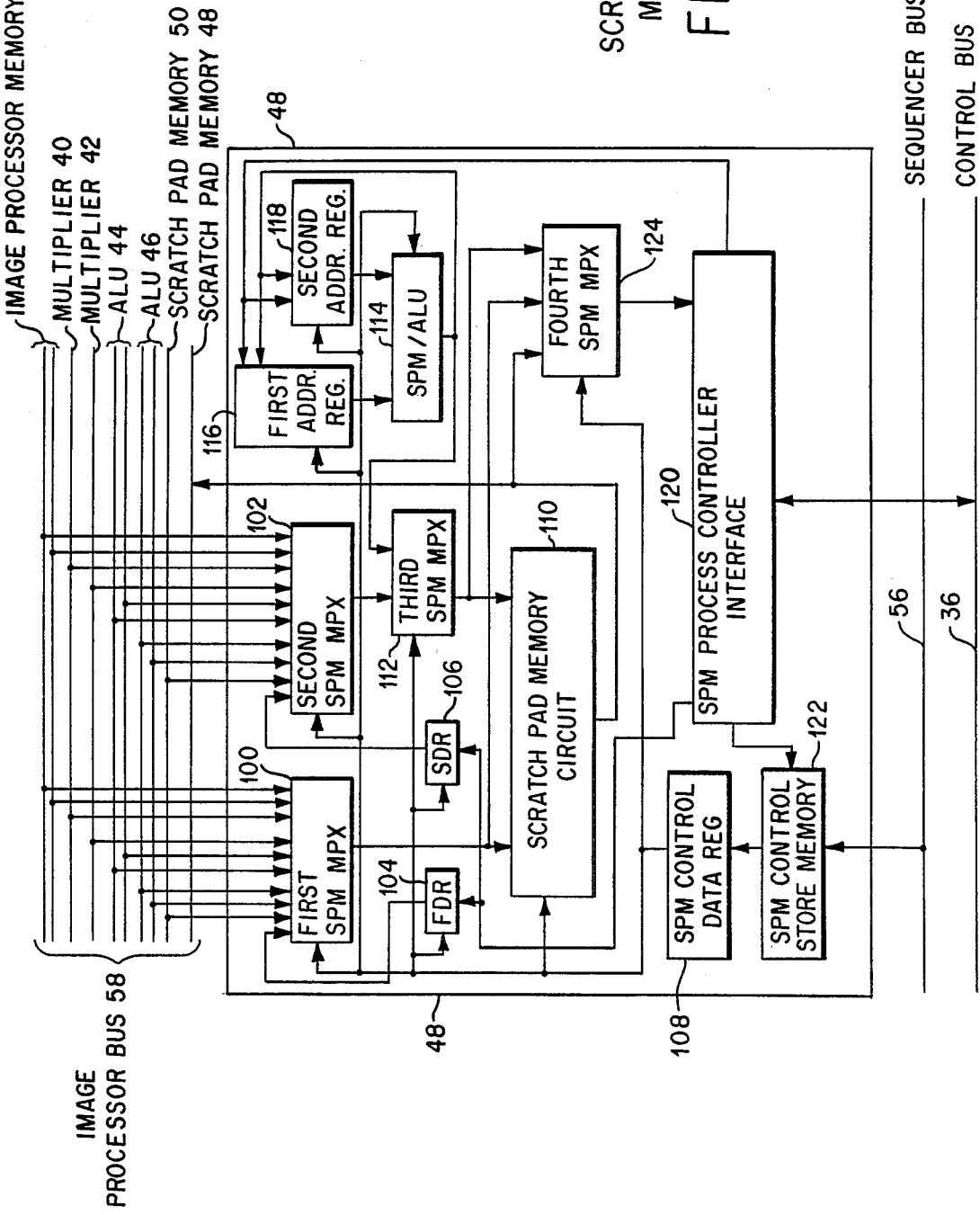
FIG. 5 is a block diagram of a scratch pad memory of the apparatus for processing image data of FIG. 2.

Referring to FIG. 5, a block diagram of a scratch pad memory (SPM) of the image processor 28 of the present invention is shown. The SPM block diagram of FIG. 5 is illustrative of both first SPM 48 and second SPM 50 which are identical in structure. Accordingly, only first SPM 48 is referred to in the foregoing description.

Image processor bus 58 is connected to a first SPM multiplexer 100 and a second SPM multiplexer 102 of SPM 48. First and second SPM multiplexers 100 and 102 receive image data and address data from image processor memory 38 and the plurality of operation means over image processor bus 58. Also, an FDR 104 and an SDR 106 are connected and provide data to first SPM multiplexer 100 and second SPM multiplexer 102, respectively.

An SPM control data register 108 is connected to SPM multiplexers 100 and 102 and to FDR 104 and SDR 106. In response to control data provided by SPM control data register 108, FDR 104 and SDR 106 transfer data to SPM multiplexers 100 and 102, and SPM multiplexers 100 and 102 select a first and second input, respectively.

The first input selected by SPM multiplexer 100 is image data for storage in a scratch pad memory device 110 of SPM 48. Scratch pad memory device 110 has memory locations identified by address. SPM multiplexer 102 selects a second input which is used by a third SPM multiplexer 112 in selecting an address of a scratch pad memory device location for storing the image data of the first input. SPM control data register 108 is connected to third SPM multiplexer 112 and controls third SPM multiplexer 112 by providing control data.

Third SPM multiplexer 112 may also select an address of a location of scratch pad memory device 110 from which image data comprising an output of SPM 44 is to be transferred. Image data comprising an output of SPM 44 is transferred to a line of image processor bus 58 to make the image data output of SPM 44 available to image processor memory 38 and the plurality of operation means of image processor 28.

Third SPM multiplexer 112 selects an address from between the second input selected by second SPM multiplexer 102 and from an output from an ALU internal to first SPM 48, SPM/ALU 114. SPM/ALU 114 is connected to SPM control data register 108 and is controlled by control data from SPM control data register 108. SPM/ALU 114 selects an address in accordance with an initial address and an incremented address provided by a first address register 116 and a second address register 118 which are connected to SPM/ALU 114. Address register 116 and 118 are connected to SPM/ALU 114 and an SPM process controller interface 120. The initial address is provided to address registers 116 and 118 from SPM process controller interface 120 SPM/ALU 114 provides address registers 116 and 118 and third SPM multiplexer 112 with an incremented address which may be utilized in accessing a location of Scratch Pad Memory circuit 110.

SPM control data register 108 is connected to a SPM control store memory 122 which is also connected to SPM process controller interface 120. SPM process controller interface 120 receives control data from process controller 34 over control bus 36 and transfers the data to SPM control store memory locations predetermined by process controller 34. SPM process controller interface 120 also receives data from process controller 34 for transfer to FDR 104 and SDR 106. The data is transferred to FDR 104 and SDR 106 for possible selection by first and second SPM multiplexers 100 and 102.

A fourth SPM multiplexer 124 which is controlled by SPM control data register 108 is connected between first SPM multiplexer 100, third SPM multiplexer 102, Scratch Pad Memory circuit 110 and SPM process controller interface 120. Fourth SPM multiplexer 124 selects between the image data available from first SPM multiplexer 100 and scratch pad memory circuit 110, and an image data address available from third SPM multiplexer 112. The selected image data or address is transferred to process controller 34 through SPM process controller interface 120 over control bus 36. Process controller 34 checks the selected image data or address received to determine whether first SPM 48 is operating in accordance with the control data.

Sequencer 52 is connected to SPM control store memory 122 by sequencer bus 56. Sequencer 52 sequentially provides SPM control store memory 122 with sequence data in the form of addresses of memory 122 to access control data stored at memory locations corresponding to the addresses provided. The control data is transferred to SPM control data register 108 and is used to control the operation of the components of first SPM 48 to which SPM control data register 108 is connected.

Figure 6:
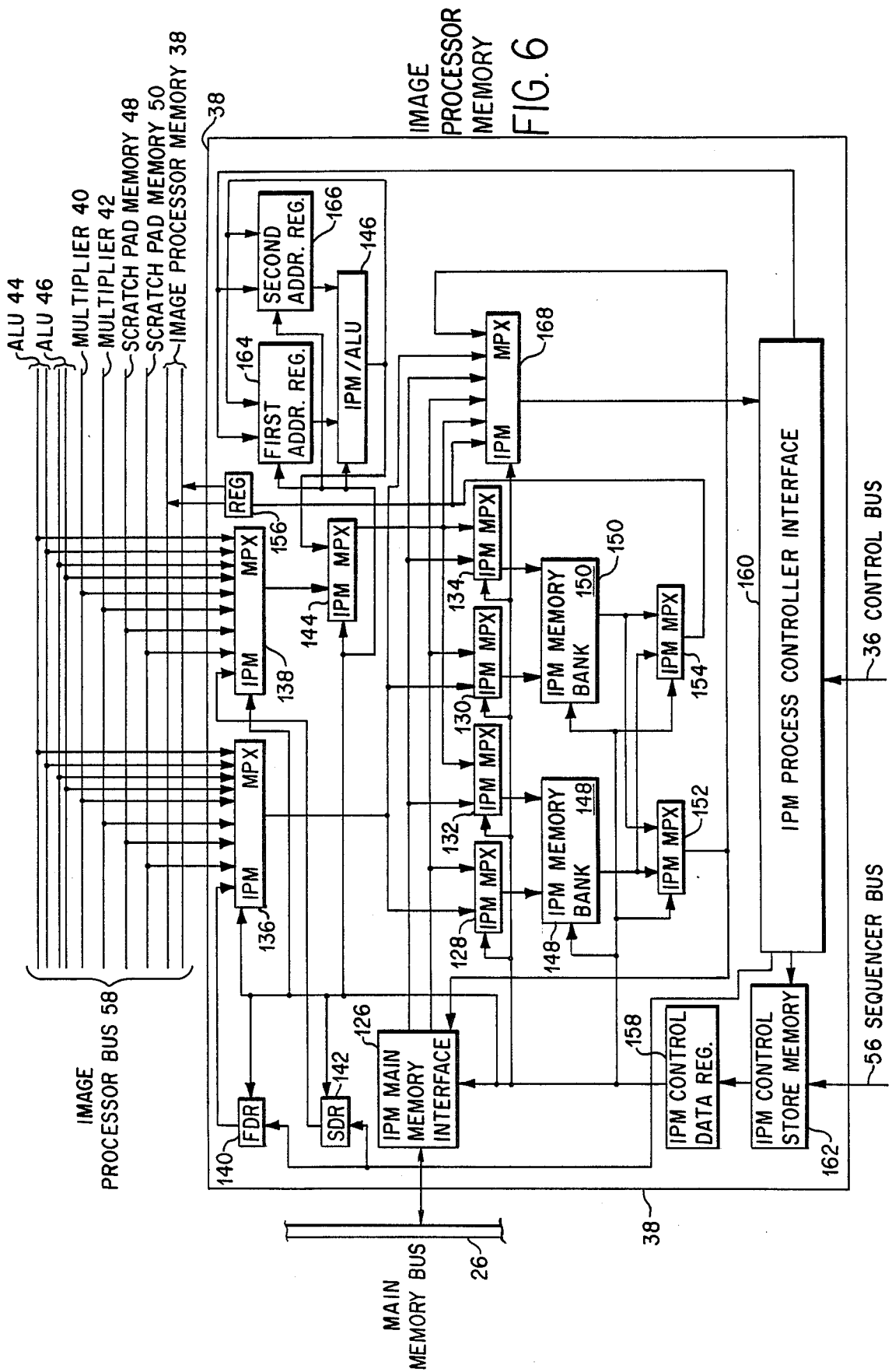
FIG. 6 is a block diagram of an image processor memory of the apparatus for processing image data of FIG. 2.

Image processor memory (hereinafter IPM) 38, as shown in FIG. 6, is connected to main memory 24 by main memory bus 26. Main memory bus 26 is connected to an IPM main memory interface 126 of IPM 38. Image and address data is transferred between main memory 24 and IPM interface 126 of IPM 38 over main memory bus 26. Main memory bus 26 includes a 32-bit image data line and a 32-bit address line. IPM interface is connected to IPM multiplexers 128, 130, 132 and 134. Image data from main memory 24 is transferred to IPM multiplexers 128 and 130. Addresses associated with the image data transferred to IPM multiplexers 128 and 130 are transferred to IPM multiplexers 132 and 134, respectively.

Image data available from the plurality of operating means over image processor bus 58 or from an FDR 140 may also be transferred to IPM multiplexers 128 and 130 through an IPM multiplexer 136.

Address data available over image processor bus 58 or from an SDR 142 is transferred to an IPM multiplexer 138. IPM multiplexer 138 selects an input available over image processor bus 58 and from an SDR 142. The selected address is transferred to an IPM multiplexer 144 which is connected to IPM multiplexer 138. IPM multiplexer 144 selects between addresses available from IPM multiplexer 138 and an IPM/ALU 146 which is also connected to IPM multiplexer 144. IPM multiplexer 144 is connected to IPM multiplexers 132 and 134 and provides IPM multiplexers 132 and 134 with another address.

Outputs from IPM multiplexers 128 and 132 are connected to a memory bank 148 and are operative to store image data selected by multiplexer 128 into a memory location of IPM memory bank 148 identified by an address selected by IPM multiplexer 132.

Outputs from IPM multiplexers 130 and 134 are connected to a memory bank 150 and are operative to store image data selected by multiplexer 130 into a memory location of an IPM memory bank 150 identified by an address selected by IPM multiplexer 134. IPM memory banks 148 and 150 are connected to IPM multiplexers 152, and 154 and outputs from IPM memory banks 148 and 150 are transferred to IPM multiplexers 152 and 154. IPM multiplexer 152 is connected to IPM main memory interface 126 and IPM multiplexer 154 is connected to a register 156. IPM multiplexer 152 selects a memory bank output for transfer to IPM main memory interface 126 and IPM multiplexer 154 selects a memory bank output for transfer to register 156.

Image data of 64-bits may simultaneously be transferred to IPM interface 126 from IPM multiplexer 152 and to register 156 from IPM multiplexer 154. Image data stored in register 156 is provided to two lines of image processor bus 58. The 32 most significant bits are provided on a first line and the least significant bits are provided on a second line. Accordingly, the most and least significant bits of IPM memory may be provided simultaneously to two separate operating means over image processor bus 58. Each of the above-listed IPM devices (that is IPM main memory interface 126, IPM multiplexers, 128, 130, 132, 134, 136, 138, 144, 152, 154, FDR 140, SDR 142, IPM/ALU 146 and IPM memory banks 148 and 150) are controlled by a IPM control data register 158 which is connected to each of the above-listed IPM devices.

Data from FDR 140 and SDR 142 available for selection by IPM multiplexers 136 and 138, respectively, is provided to FDR 140 and SDR 142 from process controller 34 through a IPM process controller interface 160 interposed therebetween. In addition to serving as an interface between process controller 34 and FDR 140 and SDR 142 to provide data to FDR 140 and SDR 142, IPM process controller interface 160 serves as an interface between image processor 34 and an IPM control store memory 162 for providing control data from process controller 34 to locations of IPM control store memory 162 identified by address Control data is stored in locations of IPM control store memory predetermined by process controller 34. Control data is subsequently transferred from IPM control store memory 162 to IPM data control register 158 to control the operation of IPM 38.

IPM process control interface 160 also transfers data (addresses) between process controller 34 and a 1st IPM address register 164 and between process controller 34 and a second IPM address register 166. An initial address for possible selection by IPM multiplexer 144 is made available to IPM/ALU 146 through first and second IPM address registers 164 and 166. IPM/ALU 146 increments the address provided and selects an initial or an incremented address for transfer to IPM multiplexer 144 which selects an address for transfer to IPM multiplexers 132 and 134 as described above. The incremented address is also transferred from IPM/ALU 146 to first and second IPM address registers 164 and 166. IPM control data register 158 is connected to first and second IPM address registers 164 and 166. First and second IPM address registers 164 and 166 are controlled by control data provided by IPM control data register 158.

IPM 38 further includes an IPM multiplexer 168 which receives image data inputs from IPM main memory interface 126, IPM multiplexers 136, 152, 154 and address inputs from IPM main memory interface 126 and IPM multiplexer 144 IPM multiplexer 144 selects between the available inputs and transfers the selected input to process controller 34 through an IPM process controller interface 160 which is interposed between IPM multiplexer 144 and process controller 34 process controller 34 checks the selected input to determine whether IPM 38 is operating in accordance with the control data.

Sequencer 52 is connected to IPM control store memory 162 by sequencer bus 56. Sequencer 52 sequentially provides IPM control store memory 162 with sequence data in the form of addresses of memory 162 to access control data stored at memory locations corresponding to the addresses provided The control data is transferred to IPM control data register 158 and controls the operation of IPM 38 as described above.

Memory 38 and the plurality of operating means, herein embodied as first multipler 40, second multipler 42, first ALU 44, second ALU 46, first SPM 48 and second SPM 50 are interconnected to perform, for example, the processing functions of correction, convolution, back projection, enlargement, and overlapping. Tomographic images are constructed by performing a combination of the foregoing processing functions As described, IPM 38 and the plurality of operating means each include multiplexers which are connected to image processor bus 58 for receiving inputs. Control data provided to these multiplexers of IPM 38 and the plurality of operation means by process controller 34 selectively interconnects IPM 38 and the plurality of operation means to perform a sequence of operations which comprise the basic steps necessary to complete a processing function The cycle time required to perform any single operation is the same for IPM 38 and each of the plurality of operation means. IPM 38 and the plurality of operating means are synchronized to begin and complete operations at the same time. Accordingly, processing functions requiring simultaneous operations by IPM 38 or any of the plurality of operation means of the present invention may be accomplished.

Figure 7:
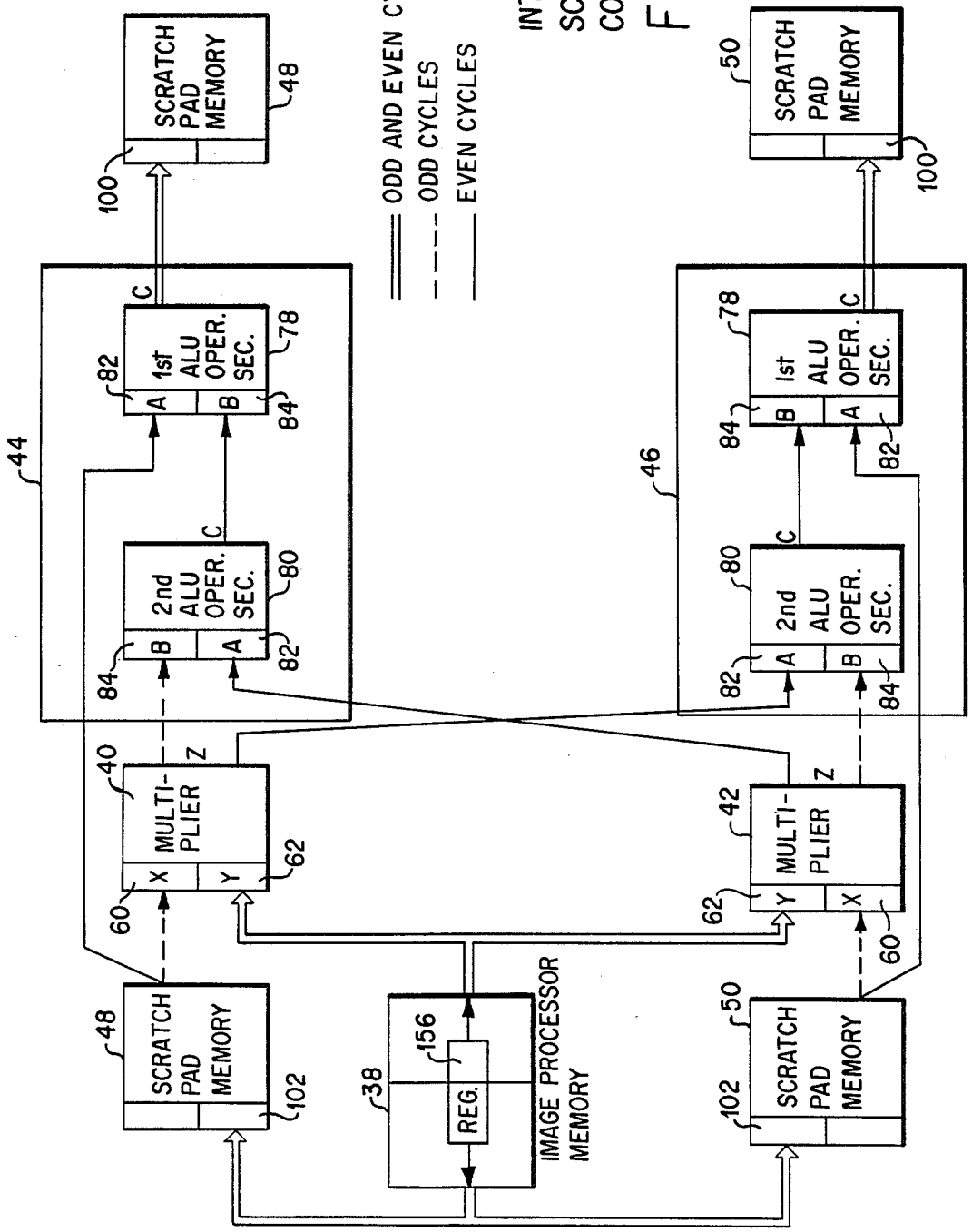
FIG. 7 is a block diagram of an interconnection scheme for the apparatus for processing image data of FIG. 2, wherein the image processor memory and operating means of the apparatus are interconnected to perform convolution in accordance with a Fast Fourier Transform function.

By way of example, an interconnection scheme of IPM 38 and the plurality of operation means of the image processor of the present invention for performing convolution in accordance with the Fast Fourier Transform function is shown in the block diagram of FIG. 7. The interconnection scheme is described below.

The output of IPM 38 available over image processor bus 58 is 64 bits of data from register 156. The most significant 32 bits are output on one line of image processor bus 58 and the least significant bits are output on another line of image processor bus 58. In the interconnection scheme of FIG. 7, the 32 most significant bits comprise address data which is transferred to SPMs 48 and 50 for selection (as data inputs) by SPM multiplexers 102 of SPMs 48 and 50. The 32 least significant bits comprise image data which is transferred to multipliers 40 and 42 for selection (as inputs Y) by SMMs 62 of multipliers 40 and 42. Image data output from SPMs 48 and 50 is transferred to multipliers 40 and 42 for selection (as inputs X) by FMMs 60 of multipliers 40 and 42. Image data output from SPMs 48 and 50 is also transferred to first operation sections 78 of ALUs 44 and 46. Image data is transferred to inputs X of multipliers 40 and 42 from SPMs 48 and 50, respectively, and to inputs A of first operation sections 78 of ALUs 44 and 46, respectively. The transfers to multipliers 40 and 42, and SPMs 48 and 50 are during alternate cycles, odd cycles and even cycles, respectively.

Outputs Z from multipliers 40 and 42 are transferred to inputs B of second operation sections 80 of ALUs 44 and 46, respectively, during odd cycles and to inputs A of second operation sections 80 of ALUs 44 and 46, respectively, during even cycles. Thereafter, outputs C of second operation sections 80 of ALUs 44 and 46 are transferred from second operation sections 80 of ALUs 44 and 46 to inputs B of first operation sections 78 of ALUs 44 and 46, respectively, during an even cycle. Outputs C of first operation sections 78 of ALUs 44 and 46 are transferred to memory locations for storing image data of SPMs 48 and 50, respectively. SPMs 48 and 50 are shown twice in FIG. 7 to emphasize the separate flow of data and addresses. The foregoing interconnection scheme accomplishes the Fast Fourier Transform function in two cycles.

Describing the Fast Fourier Transform function in greater detail, image data temporarily stored in disk unit 32 is transferred to IPM 38 through main memory 24. Real and imaginary parts of the image data are subsequently stored in SPMs 48 and 50, respectively. Addresses of 32-bits identifying the SPM locations in which the image data is stored are entered in IPM 38 as the 32 most significant bits. The least significant bits (32-bits) stored in IPM 38 contain sine or cosine information. In response to addresses supplied by IPM 38, SPMs 48 and 50 supply image data to multipliers 40 and 42, respectively, at odd cycles. The image data is multiplied by sine or cosine information provided to multipliers 40 and 42 directly from IPM 38. The same image data supplied from SPMs 48 and 50 to multipliers 40 and 42, respectively is supplied from SPMs 48 and 50 to first sections 78 of ALUs 44 and 46 during a subsequent even cycle.

Multipliers 40 and 42 perform the multiplication of inputs X and Y during the same odd cycle in which image data is received from SPMs 48 and 50, respectively. The outputs Z from multipliers 40 and 42 are transferred to second section 80 of ALUs 44 and 46, respectively, during the same odd cycle. In the subsequent even cycle, output Z of multiplier 42 is transferred to second operation section 80 of ALU 44, and second operation section 80 of ALU 44 performs an addition of outputs Z from multipliers 40 and 42. Also in the same subsequent even cycle, output Z of multiplier 40 is transferred to second operation section 80 of ALU 46 and second operation section 80 performs a subtraction of outputs Z from multipliers 40 and 42.

First operation sections 78 of ALUs 44 and 46 respectively perform subtraction and addition functions. First operation section 78 of ALU 44 subtracts the output from SPM 48 and the output C from second operation section 80 of ALU 44. First operation section 78 of ALU 46 adds the outputs from SPM 50 and the output C from second operation section 80 of ALU 46. The outputs C of first operation sections 78 of ALUs 44 and 46 are transferred to memory locations of SPMs 48 and 50, respectively. The memory locations correspond to the addresses originally supplied to SPMs 48 and 50 by IPM 38. Accordingly, the image data convolved in accordance with the Fast Fourier Transform function replaces the original image data in the SPMs. The Fast Fourier Transform function is repeated a predetermined number of times. The convolved image data may be transferred to disk unit 32 through main memory 24.

Figure 8:
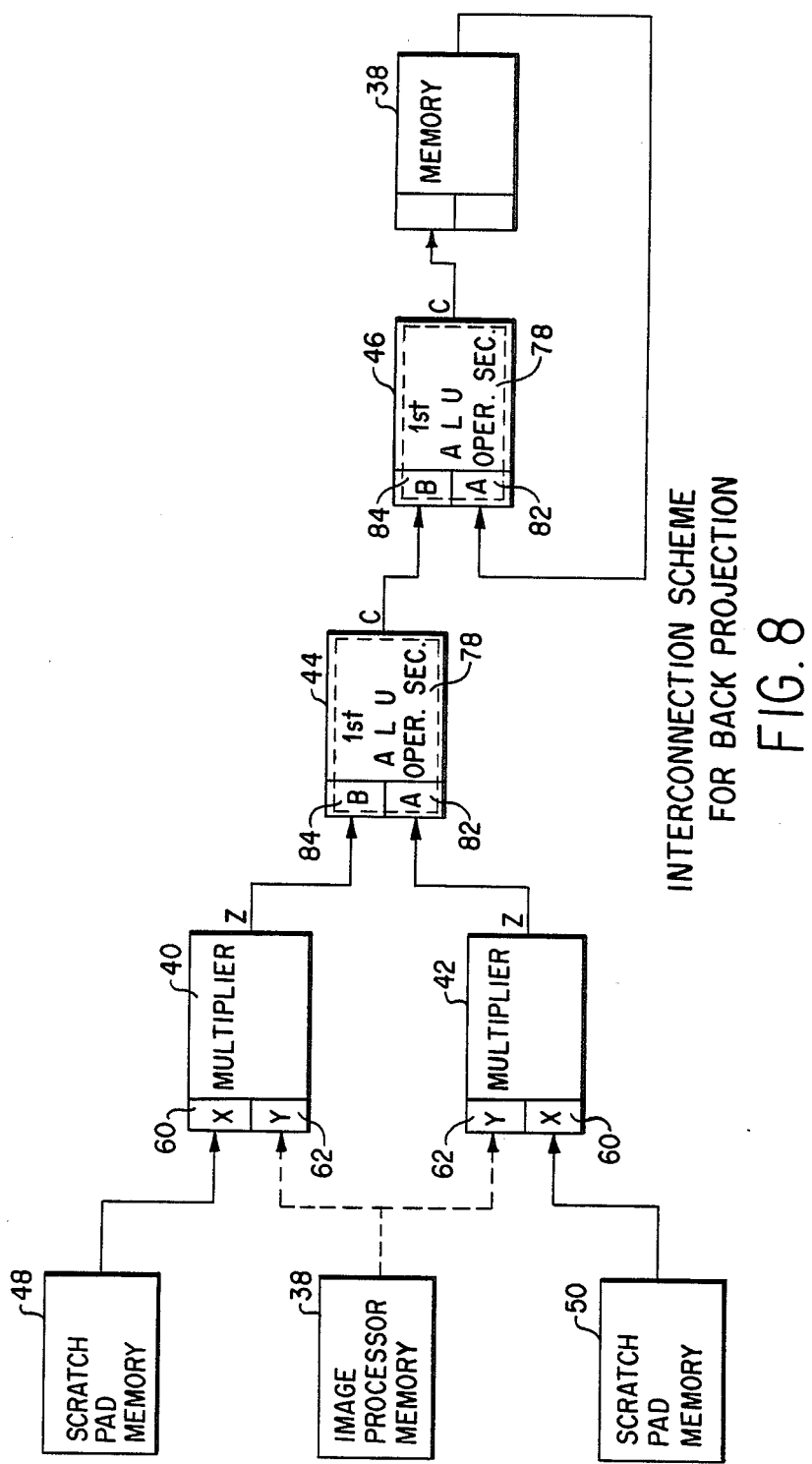
FIG. 8 is a block diagram of an interconnection scheme for the apparatus for processing image data of FIG. 2, wherein the image processor memory and operating means of the apparatus are interconnected to perform back projection.

Similarly, IPM 38 and the plurality of operation means under the control of control data from process controller 34 may subsequently be interconnected, as shown in FIG. 8, to perform the back projection function.

Convolved image data (32 bits) stored in SPMs 48 and 50 are connected to inputs X of multipliers 40 and 42, respectively Inputs Y are transferred from IPM 38. The inputs Y from IPM 38 are weighting coefficients determined by the distance between the CT system radiation source and the object scanned by the CT system scanner for any given angle of rotation of the scanner. The weighting coefficients are provided to multipliers 40 and 42 at the outset of the back projection function Image data from SPMs 48 and 50 are multiplied by the weighting coefficients by multipliers 40 and 42, respectively. The outputs Z of multipliers 40 and 42 are transferred to inputs B and A, respectively, of an operating section of ALU 44 ALU 44 adds the weighted image data to obtain a partial sum. The partial sum is transferred to input B of an operating section of ALU 46. The partial sum of image data from ALU 44 is added to existing image data provided from a given logcation of IPM 38 as input A of ALU 46. Output C of ALU 46 replaces the image data at the given location of IPM 38. The tomographic image for an object is constructed by back projecting the image data collected by the CT system scanner for the object.

As described above, multipliers 40 and 42, as used in performing the back projection function, are arranged in parallel to multiply weighting coefficients simultaneously for subsequent partial sum addition by ALU 44. Accordingly, the time in which IPM 38 is accessed can be reduced by half.

Figure 9:
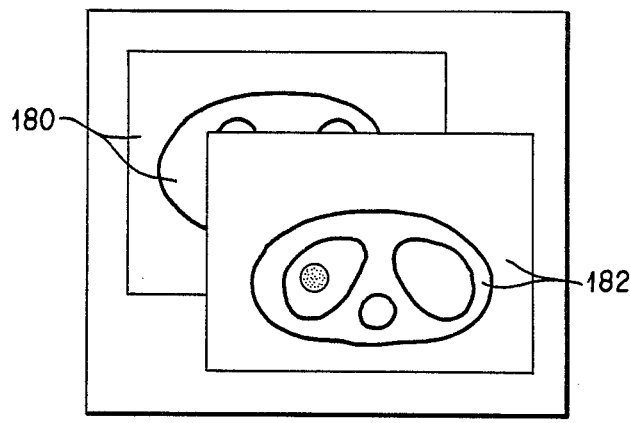
FIG. 9 is an illustration of two overlapping images for use in describing the operation of the apparatus for processing image data of FIG. 2 when the apparatus performs overlapping.
Figure 10:
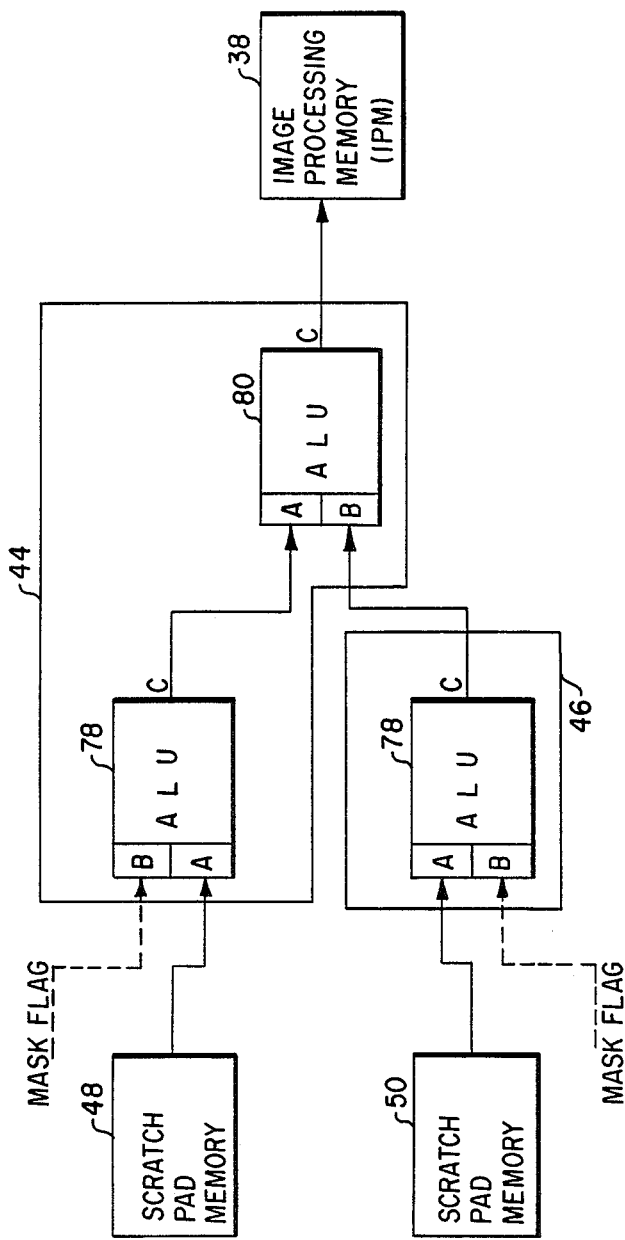
FIG. 10 is a block diagram of an interconnection scheme of the apparatus for processing image data of FIG. 2, wherein the image processor memory and operating means are interconnected to perform overlapping.

Two overlapping images are shown in FIG. 9, a lower image 180 and an upper image 182. IPM 38 and the plurality of operating means are interconnected as shown in FIG. 10 to process image data in order to construct the overlapping tomographic images as shown, for example, in FIG. 9.

Image data corresponding to lower image 180 of FIG. 9, is stored in SPM 48. Image data corresponding to upper image 182 of FIG. 9 is stored in SPM 50. Image data from SPMs 48 and 50 is transferred, as inputs A, to first operation sections 78 of ALUs 44 and 46, respectively.

A leading address transferred to first and second address registers 116 and 118 from process controller 34 enables the image data from SPMs 48 and 50 to be transferred to first operating sections 78 of ALUs 44 and 46, respectively. Fourth SPM multiplexer 124 transfers the address utilized by SPMs 48 and 50 to process controller 34 which checks the operation of SPMs 48 and 50.

Mask signals are provided as inputs B to first operation sections 78 of ALU 44 and 46. The mask signal to ALU 44 is "1" for image data from SPM 48 for image positions appearing as part of the lower image 180. The mask flag is "0" for image positions having image data of the upper image 182 stored in SPM 50. The mask signal to ALU 46 is "0" for image data from SPM 50 for image positions appearing as part of lower image 180 and stored in SPM 48. The mask flag is "1" for image positions having image data of the upper image 182 and stored in SPM 50. The mask signals are provided by process controller 34. Outputs C of first operating sections 78 of ALUs 44 and 46 are respectively connected to inputs A and B of second operating section 80 of ALU 44 which sums the outputs C to construct an overlapped image which is stored in IPM 38.

As described above, the image processor of the present invention may be utilized to flexibly perform a variety of processing functions. Control data from the process controller makes it possible for the image processing memory and the plurality of operating means to be interconnected to function as any of the single processing hardware units typically available in a convention CT system image processor. Operation means may be added to the image processor of the present invention and interconnected with the image processor memory and other operation means by control data to enhance the capability of the image processor. Further, the process controller of the image processor of the present invention can perform functional checks on each of the units comprising the image processor.

It should be apparent to those skilled in the art that various modifications may be made to the apparatus for processing image data of the subject invention without departing from the scope or spirit of the invention. Thus, it is intended that the invention cover modifications and variations of the invention, provided they come within the scope of the appended claims and their legally entitled equivalents.

We claim:

1. An apparatus for performing a plurality of operations, such as convolving, correcting and back projecting, on image data of a computerized tomography system having image data acquisition and main storage devices, comprising:

image processor memory means for storing image data;

a system clock having clock cycles;

main memory bus means for transferring said image data between said image processor memory means and the image data acquisition and main storage devices;

a plurality of operation means for performing a plurality of different arithmetic and logic functions on said image data, with said operation means each able to perform one of said functions during one of said clock cycles;

image processor bus means for interconnecting said image processor memory means and each of said plurality of operation means to permit the output of each to serve as an input for the others, said image processor memory means and said operation means each including means for selecting inputs from said image processor bus means;

process controlling means for selecting one of said plurality of operations and for transmitting control data to said image processor memory means and to said operation means corresponding to said selected operation; and means for sequencing execution of said control data in said image processing memory means and in said operation means to provide operation of said means for selecting, during each clock cycle, to execute said functions in an order which results in performance of said selected operation.

2. An apparatus of claim 1 wherein said image processor memory means and said plurality of operation means each have a plurality of input terminals and at least one output terminal, and wherein said image processor bus means has a plurality of bus lines, said bus lines each being connected to an input terminal of a corresponding one of said image processor memory means and said operation means and to a corresponding one of said output terminals of each of the remaining of said image processor memory means and said operation means.

3. An apparatus according to claim 2 further comprising control bus means for communicating said control data between said process controlling means and each of said operation and image processor memory means.

4. An apparatus of claim 3, wherein said image processor memory means and said plurality of operation means each includes control store memory means having a plurality of memory locations identified by address for storing said control data.

5. An apparatus of claim 4 wherein said image processing memory means and each of said plurality of operation means include:

process controller interface means coupled between said process controlling means and said control store memory means for receiving said control data from said process controlling means through said control bus means; and diagnostic multiplexer means for selecting a diagnostic multiplexer output from said input terminals and said output terminal in accordance with said control data and for providing said diagnostic multiplexer output to said process controller interface means to send said diagnostic multiplexer output to said process controlling means through said control bus means.

6. An apparatus of claim 5 wherein said means for selecting includes data register means connected to said process controller interface means for providing image data to one of said input terminals of said image processor memory means and to said plurality of operating means from said process controlling means.

7. An apparatus of claim 6 wherein said plurality of operation means include:

a plurality of multiplier means for multiplying data from two selected inputs in accordance with said control data to provide multiplier means output data;

a plurality of arithmetic logic means for performing arithmetic functions comprising addition, subtraction, logical sums and exclusive OR, on two selected inputs in accordance with said control data to provide arithmetic logic means output data; and a plurality of working memory means having a plurality of memory locations identified by address for selecting a first input and a second input of said plurality of inputs in accordance with said control data and for storing data from said first input at a memory location having an address identified by data from said second input and to provide a data output from a memory location having an address identified by said data from said second input.

8. An apparatus of claim 7 wherein each of said plurality of multiplier means includes:

multiplier multiplexer means, connected to said image processor bus means and said control data register means for selecting two of said plurality of multiplier means inputs in accordance with said control data; and multiplier circuit means connected to said multiplier multiplexer means and said diagnostic multiplexer for multiplying said two selected inputs to obtain a product, and for transferring said product to said image processor bus means and said diagnostic multiplexer means.

9. An apparatus of claim 23 wherein each of said plurality of arithmetic logic means includes first and second operating sections, each of said sections including ALU multiplexer means connected to said image processor bus means and said data registers for selecting two of said plurality of inputs in accordance with said control data; and ALU circuit means connected to said ALU multiplexer means and said diagnostic multiplexer means for performing arithmetic and logical functions comprising addition, subtraction and logical calculations, on said two selected inputs to obtain ALU output data and for transferring said ALU output data to said image processor bus means and said diagnostic multiplexer means.

10. An apparatus of claim 7 wherein each of said scratch pad memory (SPM) means include:

SPM multiplexer means, connected to said image processor bus means and said data registers, for selecting two of said plurality of SPM inputs in accordance with said control data wherein a first of said SPM inputs is said image data and a second of said SPM inputs is an address;

address counter means connected to said process controller interface means and said SPM multiplexer means for incrementing an address provided from said process controller interface means to obtain an incremented address, for storing said address and said incremented address, and for selecting between said address and said incremented address to obtain a selected address which is provided to said SPM multiplexer means for use in selecting said second SPM input; and scratch pad memory circuit means having memory locations identified by addresses for storing said first SPM data input in said memory location identified by said second SPM data input.

11. An apparatus of claim 7 wherein said image processor memory (IPM) means includes:

IPM multiplexer means, connected to said image processor bus means and said data registers, for selecting two of said plurality of inputs in accordance with said control data, wherein a first of said inputs is said image data and a second of said inputs is an address;

address counter means connected to said process controller interface means and said IPM multiplexer means for incrementing an address provided from said process controller interface means to obtain an incremented address, for storing said address and said incremented address, and for selecting between said address and said incremented address to obtain a selected address which is provided to said IPM multiplexer means for use in selecting said second input;

IPM memory bank means having memory locations identified by addresses for storing data from said first input in one of said memory locations identified by data from said second input; and an IPM memory interface means coupled between said main memory bus means and said IPM multiplexer means for providing said IPM multiplexer means with said first and second inputs for selection in accordance with said control data and for providing said main memory bus means with said image data stored in said IPM memory banks.

12. An apparatus of claim 2, wherein said means for selecting includes:

control store memory means having a plurality of memory locations identified by address for storing said control data, said control data specifying the interconnection to said image processor bus means to be sequentially performed each clock cycle, and for providing selected of said stored control data in response to said sequence data provided through said sequence bus means; and control data register means for temporarily holding said selected control data.

13. An apparatus of claim 12 wherein said sequencer means sequentially provides said image processor memory means and said plurality of operation means with sequence data identifying an address in said control store memory means, for storing said selected control data.

14. An apparatus of claim 2 wherein said plurality of operation means include:

a plurality of multiplier means for multiplying data from two selected inputs in accordance with said control data to provide multiplier means output data;

a plurality of arithmetic logic means for performing arithmetic logic functions, comprising addition, subtraction, logical sums and exclusive OR, on two selected inputs in accordance with said control data to provide arithmetic logic means output data; and a plurality of scratch pad memory means having a plurality of memory locations identified by address, for selecting a first input and a second input from said plurality of inputs in accordance with said control data, and for storing data from said first input at a memory location having an address identified in said data from said second input and to provide a data output from a memory location having an address contained in said data from said second input.

15. An apparatus for processing image data by performing a plurality of operations on the image data, comprising:
 (a) image processor memory means for storing the image data and communicating the image data with an external device,
 (b) a plurality of operation means, including:
  at least two multiplier means for performing multiplication of the image data,
  at least four arithmetic logic unit means for performing addition, subtraction and logical calculations of the image data,
  at least two scratch pad memory means for temporarily storing image data, and wherein each of said operation means and said image processor memory means include:
   (i) a plurality of input terminals for inputting image data,
   (ii) selecting means for selecting two input terminals among said plurality of input terminals, and
   (iii) at least one output terminal for outputting data;
 (c) image processor bus means for interconnecting each of said plurality of operation means and said image processor memory means with each other, said image processor bus means including a plurality of bus lines, each connected between said at least one output terminal of a corresponding one of said operation means and said image processor memory means and a corresponding one input terminal of each of the other of said operation means and said image processor memory means;
 (d) process controlling means for generating control data corresponding to a selected one of the plurality of operations to be performed;
 (e) means for communicating said control data to said image processor memory means and to said operation means; and
 (f) sequence means for generating sequence data and for providing said sequence data to said selecting means of each said operation means and said image processor memory means to select control data to control the interconnection of the operation means and said image processor memory means to said image processor bus means so that the operation selected by said process controlling means is performed by the interconnected image processor memory means and plurality of operation means.

* * * * *